Dec. 24, 1935.　　　M. S. ARIENS　　　2,025,494
ROTARY SOIL PULVERIZER
Filed Oct. 10, 1932　　　4 Sheets-Sheet 1
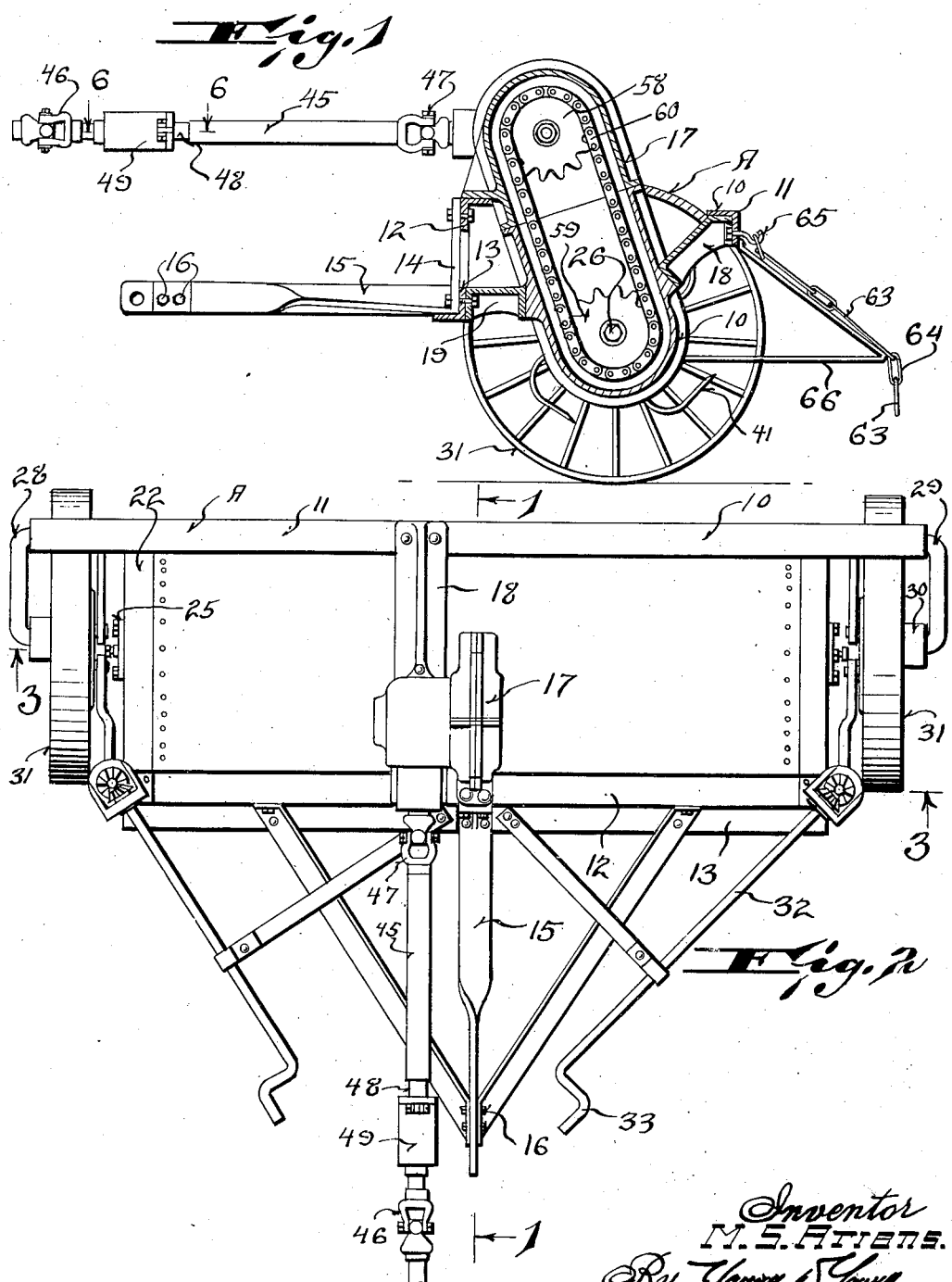
Inventor
M. S. Ariens.
By [signature]
Attorneys Dec. 24, 1935.                M. S. ARIENS                2,025,494
                         ROTARY SOIL PULVERIZER
                         Filed Oct. 10, 1932            4 Sheets-Sheet 2
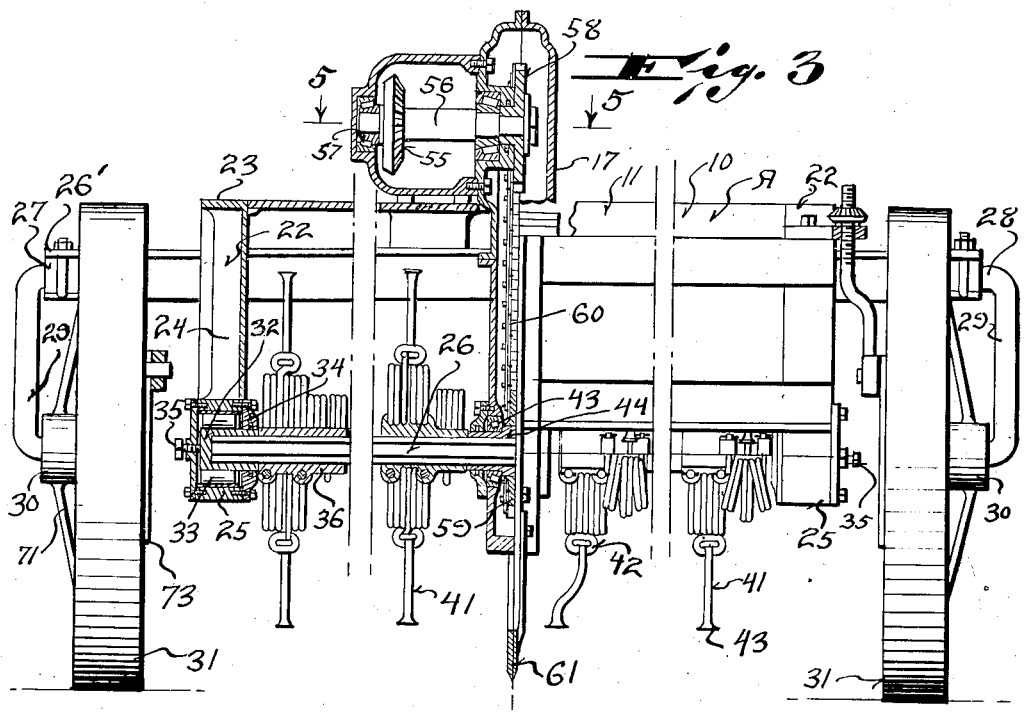
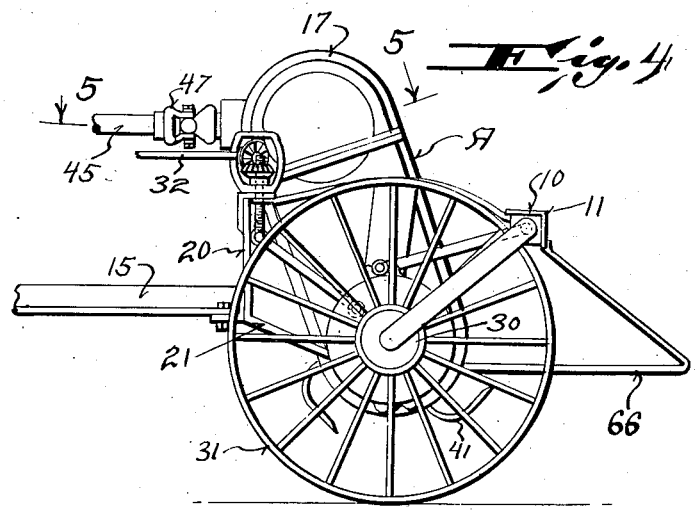
Inventor
M. S. Ariens
By Young & Young
Attorneys Dec. 24, 1935. M. S. ARIENS 2,025,494
ROTARY SOIL PULVERIZER
Filed Oct. 10, 1932 4 Sheets-Sheet 3
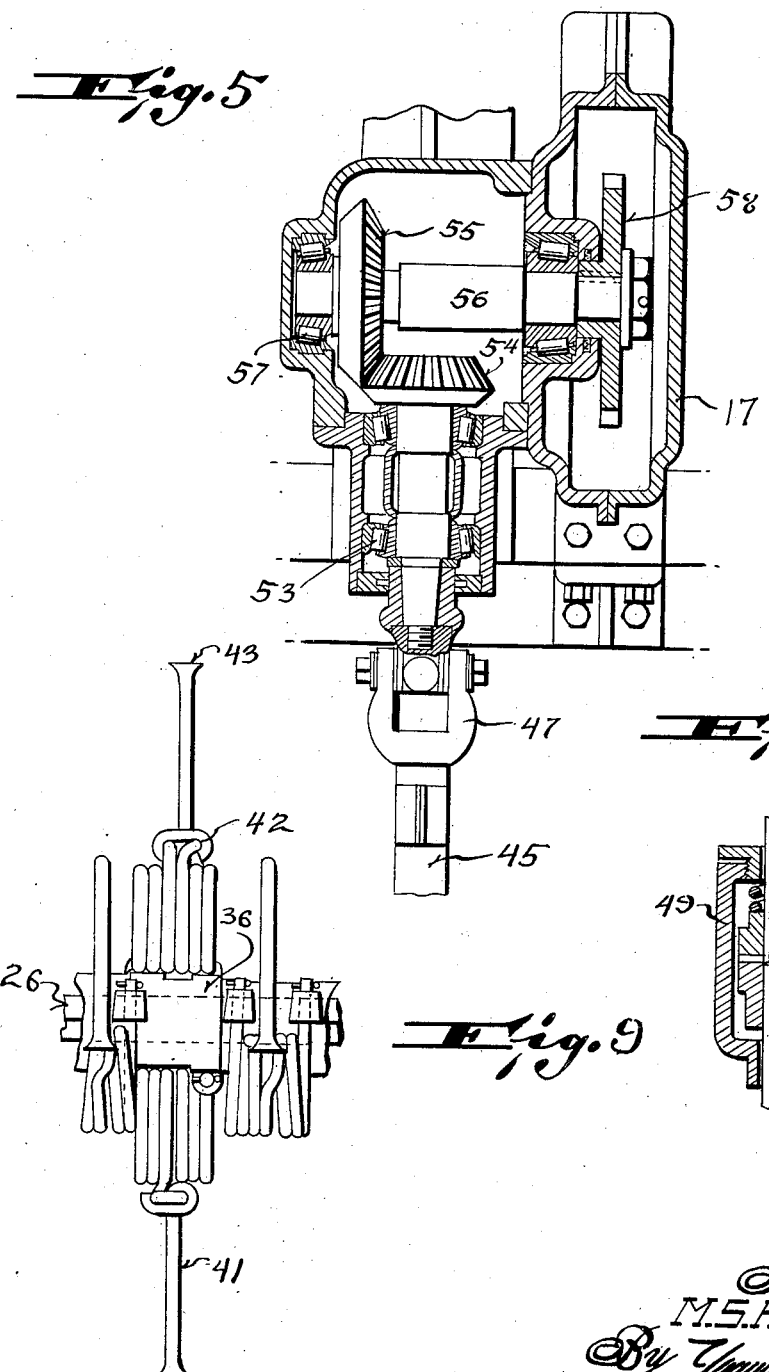

Dec. 24, 1935.  M. S. ARIENS  2,025,494
ROTARY SOIL PULVERIZER
Filed Oct. 10, 1932  4 Sheets-Sheet 4

Inventor
M. S. Ariens
By Young & Young
Attorneys

Patented Dec. 24, 1935

2,025,494

UNITED STATES PATENT OFFICE 2,025,494

ROTARY SOIL PULVERIZER

Mando S. Ariens, Brillion, Wis.

Application October 10, 1932, Serial No. 636,981

6 Claims. (Cl. 97—40)

This invention appertains to agricultural implements and more particularly to a novel rotary earth-working machine.

The tilling of soil as generally practiced today consists in first plowing the ground and then harrowing the same and finally rolling the harrowed soil. This requires three independent operations resulting in the need of a number of different machines with the loss of time and labor incident to the carrying out of the three operations.

It is therefore one of the primary objects of my invention to provide a unitary machine, so constructed and arranged that the same will effectively and easily work the soil and rapidly accomplish in one operation which heretofore has required three operations.

Another salient object of my invention is the provision of a rotary earth-working machine adapted to be drawn over the ground being cultivated by a tractor and the rotary earth-working elements operated from the power plant of the tractor.

A further important object of my invention is the provision of a rotary earth-working machine comprising a plurality of resilient tines or earth-working members with novel means for operating all of said members from the power plant of a tractor, said means embodying the use of a universal drive shaft actuated from the tractor, whereby the rotary earth-working members can be readily raised and lowered without affecting the operation of the tractor.

A further object of my invention is the provision of an operating shaft polygonal-shaped in cross section upon which the various ground engaging tines are mounted, the formation of the shaft and members allowing the members to be readily slipped on the shaft and mounted at the desired angles relative to one another.

A further object of my invention is the provision of novel means for rotatably supporting the operating shaft, whereby the shaft can be readily removed from the machine without dismantling the machine, so that the earth-working members can be quickly placed on and removed from the shaft without any material difficulty on the part of the operator.

A further object of my invention is the provision of novel means for forming the machine, whereby a minimum amount of bearings will be utilized and whereby the machine can be constructed at a comparatively low cost.

A still further object of my invention is the provision of a rotary soil pulverizer embodying a supporting frame for connection with the tractor and with means for raising and lowering the frame on its supporting wheels, whereby the earth-working tools can be readily adjusted relative to the ground or moved entirely above the ground when the machine is being moved from one field to another.

With these and other objects in view, the invention consists in the novel construction, arrangement and formation of parts as will be hereinafter more specifically described, claimed and illustrated in the accompanying drawings, in which:

Figure 1 is a transverse section through my improved machine taken on the line 1—1 of Figure 2, the view illustrating a part of the driving mechanism for the operating shaft.

Figure 2 is a top plan view of my improved machine.

Figure 3 is a longitudinal section through the machine taken on the line 3—3 of Figure 2 looking in the direction of the arrows.

Figure 4 is a side elevation of my improved machine.

Figure 5 is an enlarged detail section taken substantially on the lines 5—5 of Figures 3 and 4 illustrating a part of the novel drive mechanism for the drive shaft.

Figure 6 is a detail sectional view through the universal drive shaft for the machine illustrating the type of slip clutch utilized therein.

Figure 9 is a fragmentary top plan view of the operating shaft showing one of the tool holders associated therewith.

Figure 7:
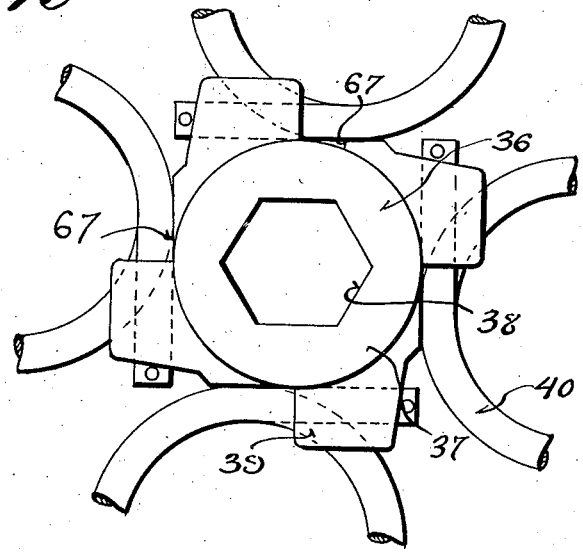
Figure 7 is an enlarged detail end elevation of one of the tool holders illustrating the means for connecting the tools therewith.

Referring to the drawings in detail, wherein similar reference characters designate the corresponding parts throughout the several views, the letter A generally indicates my improved rotary soil pulverizer which comprises a supporting frame 10.

This frame 10 embodies a main cross beam 11 arranged at the rear of the machine and a pair of spaced parallel front cross beams 12 and 13. These beams can be formed from any desired material possessing the necessary strength and as shown, these beams are of angle-bar construction. The front pair of beams 12 and 13 can be connected together in any preferred manner and as shown, I utilize upright brace bars 14, which can be bolted or otherwise secured to the said frame bars 12 and 13. The brace bars 14 may have their lower ends extended so as to project forwardly in a horizontal plane as at 15 and the ends of the extensions 15 can be converged and bolted together as at 16 so as to form a draw bar for connection with a tractor.

Arranged between the rear frame bar 11 and the front frame bars 12 and 13 is a casing 17 which forms a housing for the operating mechanism, as will be later set forth. This casing 17 can be made in sections and assembled in any preferred way, with the sections bolted or otherwise secured together.

Suitable brackets 18 and 19 can be utilized for connecting the casing with the rear frame bar 11 and the front frame bars and thus, the casing, constitutes a part of the frame of the machine. The front frame bars 12 and 13 are further connected adjacent to their terminals by brace bars 20 and these brace bars have their lower ends provided with rearwardly directed arms 21, the purpose of which will be later set forth.

Forming a part of the frame are side or end castings 22 and these end castings include longitudinally extending frame bars 23 and depending uprights 24. The ends of the frame bars 23 are bolted or otherwise secured to the rear frame bar 11 and the front top frame 12. The lower ends of the uprights 24 have formed thereon boxes 25 which support the operating shaft 26. The inner ends of the arms 21 of the brace bars 20 can be connected to the boxes 25.

The ends of the rear frame bar 11 have bolted or otherwise secured thereto, as at 26', bearings 27 which rotatably support the bearing arms 28 of axle arms 29. The lower ends of the axle arms 29 extend inwardly and form spindles 30 for rotatably supporting the ground wheels 31.

By this construction, it can be seen that the frame can be raised and lowered on the wheels 31 and any conventional mechanism can be provided for raising and lowering the frame for a purpose which will also be hereinafter more fully set forth. The raising and lowering means preferably includes rotatable shafts 32 which extend toward the front of the machine and these shafts are provided at their forward ends with hand cranks 33, so that the same can be conveniently actuated by the operator of the machine.

The operating shaft 26 supports the earth-working tools and this shaft is of a hexagonal shape in cross section, but this specific figuration can be changed providing the shaft remains of a polygonal shape in cross section. The ends of the shaft are loosely fitted in the polygonal bores of caps 32 and these caps are rotatably received within the boxes 25. Suitable roller bearings 33 are interposed between the walls of the boxes and the caps 32. End plates 34 can be connected with the boxes for retaining the bearings and the lubricant for the bearings in place. Adjustment of the shaft may be had by providing adjustable screws 35 which are carried by the outer end plates for engagement with the caps. This shaft can be quickly removed from the frame by simply removing the outer end plate of one of the boxes and by pulling the shaft longitudinally from out of the machine.

Figure 8:
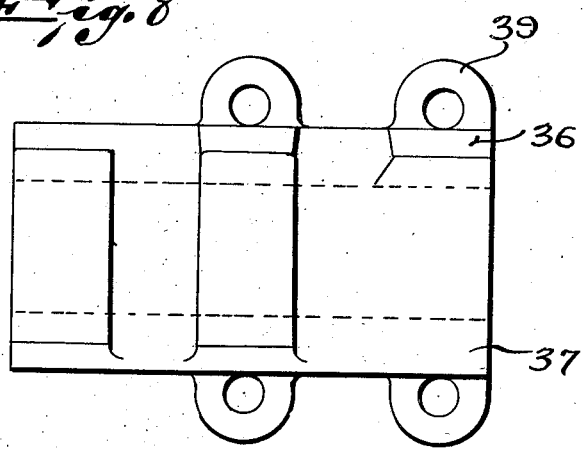
Figure 8 is a detail plan view of one of the tool holders.

Mounted upon the shaft are the tool holders 36. These tool holders 36 are shown in detail in Figures 7 and 8. By referring to these figures, it will be noted that each of the tool holders embodies a sleeve 37 having a polygonal bore 38 shaped to conform to the operating shaft 26, whereby the tool holders will be rotated with the said shaft. It is preferred to have rather a loose fit between the tool holders and the shaft so as to permit the easy slipping of these holders on the shaft during the assembling of the machine. At spaced points around the periphery of the sleeves 37 of the holders 36 are arranged pairs of ears 39 on which are mounted the ends of the coil springs 40 for the tines 41. The intermediate portions of the springs are provided with eyes or loops 42 which act as sockets for the said tines.

These tines are of an arcuate configuration and the free ends thereof are provided with teeth 43 for digging up the ground. During the assembling of the shaft and the tool holders, the tool holders are placed at different angles relative to one another on the shaft so that the tines will all radiate at different points from the shaft, and thereby insure the proper working of the ground.

By referring to Figure 3, it can be seen that the shaft 26 extends through the casing or housing 17 and that the casing or housing is provided with roller bearings 43 for rotatably supporting the said shaft. The shaft at this point can be provided with a hub sleeve 44 for engaging the said roller bearings.

Novel means is provided for rotating the operating shaft 26 from the tractor drawing my improved machine. This means comprises a main drive shaft 45 which is connected with an operating part of the tractor, so that the shaft will be actuated from the power plant of the tractor. This shaft has preferably interposed in its length a pair of universal joints 46 and 47 so that the operating shaft 26 can be continuously rotated regardless of the adjusted position of the frame 10 on the vehicle wheels. Likewise a telescopic section 48 can be interposed in the length of the shaft between the universal joints 46 and 47 so as to take care of the lengthening and shortening of the shaft during the raising or lowering of the frame.

I also can provide a slip clutch 49 in the drive shaft, so that no breakage will occur in case the tines or earth-working tools 41 should meet with an obstruction, such as a rock or the like. The slip clutch 49 can be of any improved design and in Figure 6 I have illustrated one form of slip clutch that can be utilized. As shown in this figure, the slip clutch 49 embodies a pair of facing clutch sections 50 and 51. The section 50 is feathered on one section of the operating shaft and is urged toward the clutch section 51 by means of an expansion spring 52. The other clutch section 51 is keyed or otherwise secured to the other section of the operating shaft. The operating shaft rearwardly from the rear universal joint 47 is received within the upper end of the housing or casing 17. Roller bearings 53 can be provided for the said operating shaft.

The extreme inner end of the shaft has keyed or otherwise secured thereto a bevelled pinion 54 which meshes with a bevelled gear 55 keyed or otherwise secured to a transversely disposed driven shaft 56. This driven shaft 56 can likewise be rotatably supported by suitable roller bearings 57 mounted in the said casing or housing. One end of the driven shaft 56 has keyed or otherwise secured thereto a sprocket wheel 58 which is in alinement with a sprocket wheel 59 keyed or otherwise secured to the hub sleeve 44 heretofore referred to. A sprocket chain 60 is trained about the sprocket wheels 58 and 59 and serves as means for actuating the operating shaft 26 from the transversely extending shaft 56.

As the machine is drawn across the field by the tractor, the operating shaft will be rotated and the resilient tines 41 will effectively dig up the earth and break the same into small particles.

As heretofore stated, the frame 10 is mounted for raising and lowering movement on the ground wheels 31 and consequently, the depth of penetration of the prongs into the earth can be readily regulated and when the machine is being pulled from one field to another, the frame can be lifted high enough to completely raise the tines above the ground.

In order to work the earth below the casing or housing 17, this housing can be provided with a cutting blade or plow point 61 which will serve as an effective means for acting on the ground between the tines, which are arranged on opposite sides of the casing or housing 17.

In order to level the earth after the same has been worked by the tines, I provide a series of metal plates 63 which are joined together by chain links 64. The uppermost chain links are connected to hooks 65 connected with the rear frame bar 11. These metal plates 63 engage the ground in rear of the tines and act as means for smoothing or rolling the earth. To provide means for spacing the plates from the rotary earth-working tines, rearwardly directed brackets 66 can be connected with the frame. As shown in Figure 1, these brackets engage the plates and hold the same rearwardly of the said tines.

Referring again to the sleeves 37 which act as the tool holders, it is to be noted that the sleeve in rear of the pairs of ears 39 for the springs 40 are provided with flat surfaces 67. This flat surface underneath the spring supports the spring during its recoil and prevents the breaking of the spring.

From the foregoing description, it can be seen that I have provided an exceptionally simple and durable agricultural machine, which can be effectively operated from a tractor and which will serve as an admirable means for plowing, harrowing and rolling the soil. Owing to the character of the machine, a relatively wide area of soil can be worked, each time the machine is drawn across the field.

Changes in details may be made without departing from the spirit or the scope of this invention, but what I claim as new is:

1. A tractor drawn rotary soil pulverizer comprising a frame, ground wheels for supporting the frame, a draw bar connected with the frame for connection with a tractor, a gear housing secured to an intermediate portion of the frame, depending bearings arranged on opposite sides of the gear housing connected with the frame, rotatable caps mounted within the bearings having polygonal bores, a rotatable hub sleeve mounted in the gear housing having a polygonal bore, an operating shaft polygonal-shaped in cross section mounted within the bores of the hub sleeve and the end caps, a tractor driven drive shaft rotatably mounted on the frame, a transversely extending driven shaft mounted within the gear housing, means for actuating the driven shaft at a reduced rate of speed from the drive shaft, and means for actuating the operating shaft from the driven shaft including a sprocket chain and sprocket wheels keyed respectively to the driven shaft and to the hub sleeve.

2. In a rotary soil pulverizer, a supporting frame, a rotatable operating shaft mounted on the frame, means for rotating the shaft, said shaft being polygonal-shaped in cross section, a plurality of sleeves having polygonal bores slidably mounted on the operating shaft, and spring tines secured to the sleeves at spaced points.

3. In a rotary soil pulverizer, a supporting frame, a rotatable operating shaft mounted on the frame, means for rotating the shaft, said shaft being polygonal-shaped in cross section, a plurality of sleeves having polygonal bores slidably mounted on the operating shaft, and spring tines secured to the sleeves at spaced points, said sleeves including pairs of spaced ears arranged at different points around the periphery thereof with flat bearing surfaces in rear of the ears, and springs for supporting tines anchored to the ears and engaging the flat surfaces.

4. In a rotary soil pulverizer, a frame, ground wheels for supporting the frame, depending standards connected with the frame, bearing boxes formed on the lower ends of the standards, end caps having polygonal bores rotatably mounted in the bearing boxes, end plates closing said bearing boxes, an operating shaft polygonal-shaped in cross section loosely fitted within said end caps, adjusting screws supported by the plates for engaging said end caps, and tines supporting sleeves having polygonal bores mounted on the said operating shaft.

5. A rotary soil pulverizer comprising a frame including a rear main frame bar and a pair of spaced parallel front frame bars, end castings connecting the rear frame bar and one of the front frame bars together, depending standards formed on the castings, an operating shaft rotatably mounted in said standards, a gear housing secured to an intermediate portion of the frame bars and arranged between the front and rear frame bars, a rotary hub sleeve carried by the housing having a polygonal bore receiving an intermediate portion of the operating shaft, a draw bar forming a part of the frame for connection with a tractor, a tractor actuated drive shaft rotatably supported by the frame, a driven shaft rotatably mounted within the housing, means for actuating the driven shaft and the drive shaft including a bevelled pinion keyed to the drive shaft and a bevelled gear keyed to the driven shaft, and means for actuating the driven shaft from the drive shaft including a sprocket chain and sprocket wheels keyed respectively to the driven shaft and to the hub sleeve.

6. A rotary soil pulverizer comprising a frame including a rear main frame bar and a pair of spaced parallel front frame bars, end castings connecting the rear frame bar and one of the front frame bars together, depending standards formed on the castings, an operating shaft rotatably mounted in said standards, a gear housing secured to an intermediate portion of the frame bars and arranged between the front and rear frame bars, a rotary hub sleeve carried by the housing having a polygonal bore receiving an intermediate portion of the operating shaft, a draw bar forming a part of the frame for connection with a tractor, a tractor actuated drive shaft rotatably supported by the frame, a driven shaft rotatably mounted within the housing, means for actuating the driven shaft and the drive shaft including a bevelled pinion keyed to the drive shaft and a bevelled gear keyed to the driven shaft, and means for actuating the driven shaft from the drive shaft including a sprocket chain and sprocket wheels keyed respectively to the driven shaft and to the hub sleeve, tool sleeves having polygonal bores mounted on the operating shaft on each side of the gear housing, resilient tines connected with the sleeves, and an earth-working blade connected with the gear housing between said tines.

MANDO S. ARIENS.